(12) United States Patent
Lee et al.

(10) Patent No.: US 9,022,188 B2
(45) Date of Patent: May 5, 2015

(54) DUST SEAL STRUCTURE FOR SHOCK ABSORBER

(75) Inventors: Yoon Hyun Lee, Jeollabuk-do (KR); Ki Haeng Cho, Jeollabuk-do (KR)

(73) Assignee: Mando Corporation, Pyeongtaek-Si, Gyeonggi-Do (KR)

( * ) Notice: Subject to any disclaimer, the term of this patent is extended or adjusted under 35 U.S.C. 154(b) by 60 days.

(21) Appl. No.: 13/541,270

(22) Filed: Jul. 3, 2012

(65) Prior Publication Data

US 2013/0146408 A1    Jun. 13, 2013

(30) Foreign Application Priority Data

Dec. 12, 2011    (KR) .................. 10-2011-0132745

(51) Int. Cl.
*F16F 9/36*    (2006.01)
*F16F 9/38*    (2006.01)

(52) U.S. Cl.
CPC .... *F16F 9/36* (2013.01); *F16F 9/38* (2013.01)

(58) Field of Classification Search
CPC ..................................... F16F 9/36; F16F 9/38
USPC ............................ 188/322.15, 322.16, 322.17
See application file for complete search history.

(56) References Cited

U.S. PATENT DOCUMENTS

| | | | | |
|---|---|---|---|---|
| 2,643,147 A * | 6/1953 | Funkhouser et al. | ......... | 277/560 |
| 4,331,224 A * | 5/1982 | Sano | .......................... | 188/282.8 |
| 4,364,457 A * | 12/1982 | Wossner et al. | .......... | 188/322.17 |
| 4,989,701 A * | 2/1991 | Yamaoka et al. | ........ | 188/322.17 |
| 4,995,623 A * | 2/1991 | Wada et al. | .................... | 277/552 |
| 5,363,945 A * | 11/1994 | Lizell et al. | .................... | 188/281 |
| 5,507,505 A * | 4/1996 | von-Arndt et al. | ............. | 277/560 |
| 5,664,651 A * | 9/1997 | Miura et al. | ................. | 188/322.17 |
| 5,765,666 A * | 6/1998 | Provence et al. | ........ | 188/322.17 |
| 6,158,559 A * | 12/2000 | Asa et al. | ................. | 188/322.17 |
| 6,173,960 B1 * | 1/2001 | Inose et al. | ..................... | 277/347 |
| 6,547,046 B2 * | 4/2003 | Yamaguchi et al. | ...... | 188/322.17 |
| 6,659,243 B2 * | 12/2003 | Yasuda | ..................... | 188/322.17 |
| 7,226,045 B2 * | 6/2007 | Brookes | ..................... | 267/64.27 |
| 7,703,587 B2 * | 4/2010 | Strong | ..................... | 188/322.17 |
| 7,793,584 B2 * | 9/2010 | Murakami et al. | .............. | 92/168 |
| 7,810,619 B2 * | 10/2010 | Maeda | ................. | 188/322.17 |
| 2003/0024780 A1 * | 2/2003 | Yasuda | ..................... | 188/322.17 |
| 2009/0194379 A1 * | 8/2009 | Maeda | ..................... | 188/322.22 |
| 2009/0205914 A1 * | 8/2009 | Beyer et al. | .............. | 188/322.17 |
| 2010/0142747 A1 * | 6/2010 | Kemmerer | ..................... | 381/387 |

(Continued)

FOREIGN PATENT DOCUMENTS

| | | |
|---|---|---|
| JP | 63-8443 A | 1/1988 |
| JP | 2001-330074 A | 11/2001 |

OTHER PUBLICATIONS

Korean Office Action issued in Korean Application No. 10-2011-0132745 on Jun. 3, 2013.

(Continued)

*Primary Examiner* — Robert A Siconolfi
*Assistant Examiner* — James Hsiao
(74) *Attorney, Agent, or Firm* — McDermott Will & Emery LLP

(57) ABSTRACT

A dust seal structure for a shock absorber includes a cylindrical base shell, in which a piston valve and a piston rod are embedded, a cap member covering one end of the base shell, an oil seal sealing the base shell, and a dust sealing member blocking dusts from being introduced at one side of the oil seal.

16 Claims, 4 Drawing Sheets

(56) References Cited

U.S. PATENT DOCUMENTS

| | | | |
|---|---|---|---|
| 2011/0048879 A1* | 3/2011 | Wang | 188/318 |
| 2011/0097948 A1* | 4/2011 | Melni | 439/733.1 |
| 2012/0152671 A1* | 6/2012 | Murakami | 188/315 |
| 2012/0255822 A1* | 10/2012 | Ito | 188/314 |

OTHER PUBLICATIONS

Chinese Office Action issued in Chinese Application No. 201210201581.6 dated Jul. 3, 2014.

\* cited by examiner

DUST SEAL STRUCTURE FOR SHOCK ABSORBER

CROSS-REFERENCE(S) TO RELATED APPLICATION

This application claims priority of Korean Patent Application No. 10-2011-0132745, filed on Dec. 12, 2011, in the Korean Intellectual Property Office, which is hereby incorporated by reference in its entirety.

BACKGROUND OF THE INVENTION

1. Field of the Invention

The present invention relates to a dust seal of a suspension for use in a vehicle, that is, a shock absorber, and more particularly, to a dust seal structure for a shock absorber, which prevents dusts from being introduced between a piston rod and a cap member (base cap) attached over a base shell forming the outer appearance of the shock absorber.

2. Description of the Related Art

A conventional vehicle uses various kinds of suspensions for improving operational performance or a ride comfort. In particular, a suspension combined with a spring, that is, a shock absorber, is used between a vehicle wheel and a vehicle body in order to absorb a vibration or impact force.

In general, a shock absorber includes a cylinder filled with a working fluid, a piston installed at an end of a rod and reciprocating within the cylinder, and a valve installed in the piston.

In such a conventional shock absorber, as shown in FIG. 1, a rod guide 5 guiding a straight line movement of a piston rod 3, and an oil seal 7 sealing a working fluid filled within a cylinder are installed over a base shell 1 forming the outer appearance of the cylinder.

In addition, a cap member (base cap) 10 including a plurality of dust discharge openings 11 is covered over the base shell 1 in order to protect the rod guide 5 and the oil seal 7.

In the conventional shock absorber, however, dusts introduced between the cap member 10 and the piston rod 3 are not smoothly discharged. Therefore, dusts are accumulated on the oil seal 7, causing oil leakage. This oil leakage degrades the performance and durability of the cylinder.

SUMMARY OF THE INVENTION

An aspect of the present invention is directed to a dust seal structure for a shock absorber, which prevents oil leakage of a cylinder by dust sealing between a cap member and a piston rod.

According to an embodiment of the present invention, a dust seal structure for a shock absorber includes: a cylindrical base shell in which a piston valve and a piston rod are embedded; a cap member covering one end of the base shell; an oil seal sealing the base shell; and a dust sealing member blocking dusts from being introduced at one side of the oil seal.

The dust sealing member may include: a disk-shaped brush portion with a hollow portion into which the piston rod is insertable; a rubber portion enclosing the brush portion; and a blocking plate protruding from the rubber portion of a hollow portion side to seal a gap between the hollow portion and the piston rod.

The blocking plate may be integrally formed with the rubber portion and protrude to be inclined from the rubber portion.

The cap member may include: a through-hole which is formed in a central portion of the cap member and into which the piston rod is insertable; and an installation groove which is recessed along a lower circumference of the through-hole and into which the dust sealing member is fit.

The rubber portion may include: one or more latching protrusions formed on an outer peripheral surface of the rubber portion; and one or more latching grooves formed corresponding to the one or more latching protrusions in the installation groove.

The rubber portion may include: a latching hook formed on an outer surface of the rubber portion; and an assembly hook formed corresponding to the latching hook in the installation groove.

The brush portion may include a support portion bent downward from an outer periphery of the brush portion and supported to the base shell.

The brush portion may include a fixing portion bent outward from a lower end of the support portion and fit and fixed between the base shell and the cap member.

The cap member may include: a through-hole which is formed in an upper central portion of the cap member and into which the piston rod is insertable; and a plurality of discharge groove portions extending radially from the through-hole in order to discharge dusts.

Figure 1:
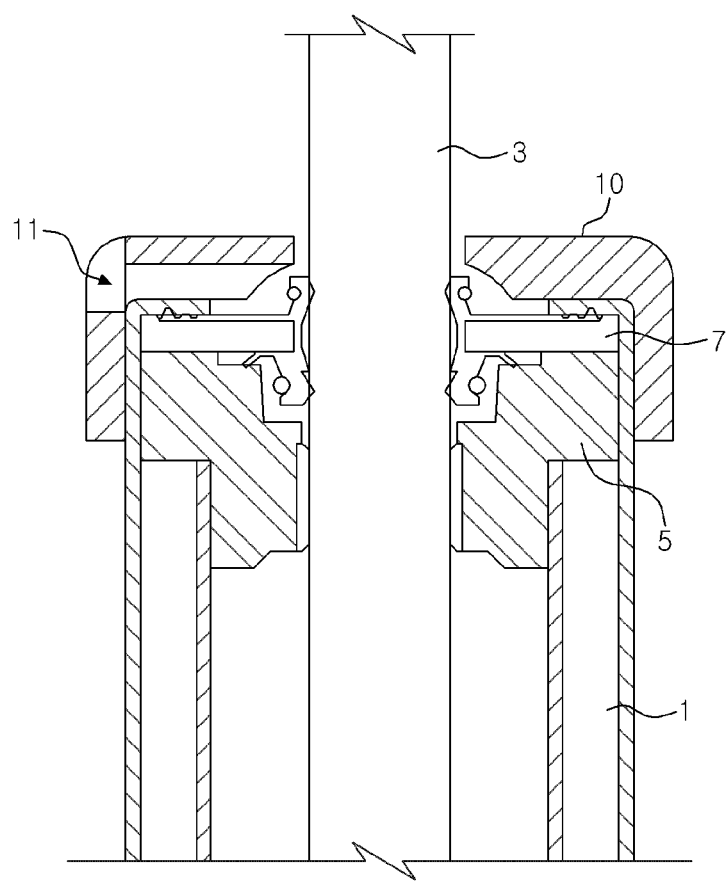
FIG. 1 is a cross-sectional view showing main parts of a conventional shock absorber.

| <Description of Reference Numerals> | |
|---|---|
| 1: base shell | 3: piston rod |
| 5: rod guide | 7: oil seal |
| 20: cap member | 21: through-hole |
| 23: installation groove | 29: discharge groove portion |
| 30: dust sealing member | 31: brush portion |
| 33: rubber portion | 35: blocking plate |

DETAILED DESCRIPTION OF EXEMPLARY EMBODIMENTS

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Like reference numerals refer to like elements throughout this disclosure.

Figure 2:
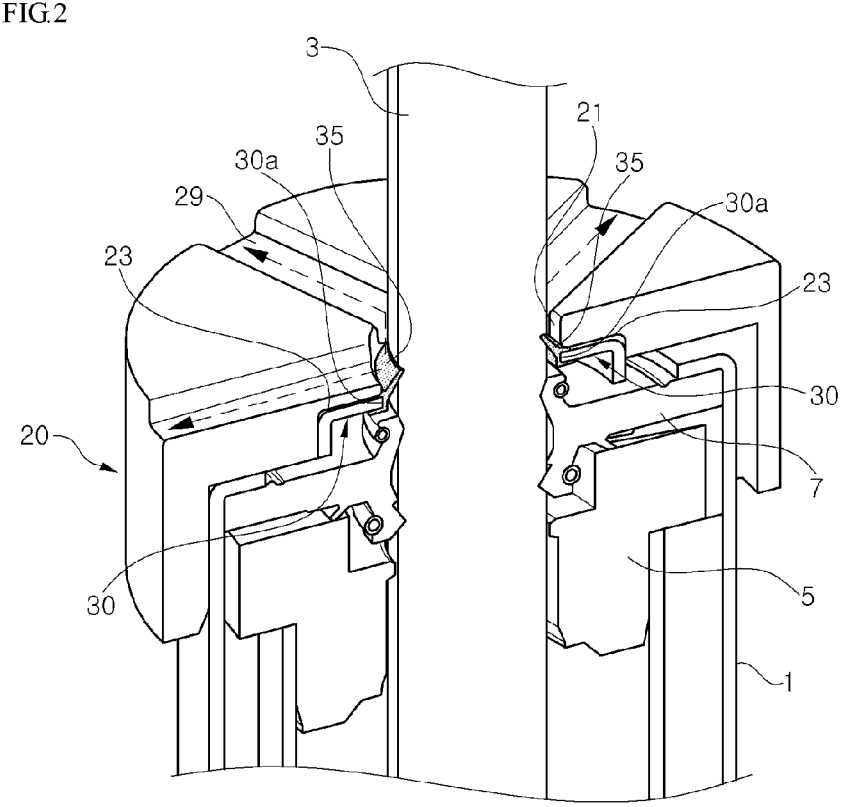
FIG. 2 is a cross-sectional perspective view showing main parts of a dust seal structure for a shock absorber according to the present invention.

FIG. 2 is a cross-sectional perspective view showing main parts of a dust seal structure for a shock absorber according to the present invention.

As shown in FIG. 2, a cap member (base cap) 20 according to the present invention is attached over a base shell 1. As with the related art, a rod guide 5 guiding a straight line movement of a piston rod 3, and an oil seal 7 sealing a working fluid filled within a cylinder are installed over the base shell 1 forming the outer appearance of the cylinder.

A dust sealing member 30, which is a characteristic element of the present invention, is installed under the cap member 20. In addition, a through-hole 21, into which the piston rod 3 is insertable, is formed in the central portion of the cap member 20. In the cap member 20, an installation groove 23 recessed along the circumference of the through-hole 21 is formed in the bottom surface of the cap member 20 in order to install the dust sealing member 30.

The dust sealing member 30 prevents dusts from being introduced through the through-hole 21 of the cap member 20 and accumulated on the oil seal 7. The dust sealing member 30 is fit into the installation groove 23 and serves to dust-seal a gap between the through-hole 21 and the piston rod 3 inserted into the through-hole 21.

In addition, the cap member 20 includes a plurality of discharge groove portions 29 which are formed on the top surface of the cap member 20 and extend radially from the through-hole 21. Since the discharge groove portions 29 extend from the through-hole 21 up to the edge of the cap member 20, dusts blocked by the dust sealing member 30 are discharged to the outside of the base shell 1 through the discharge groove portions 29.

An assembly structure of the dust sealing member 30 according to embodiments of the present invention will be described with reference to FIGS. 3 to 6.

Figure 3:
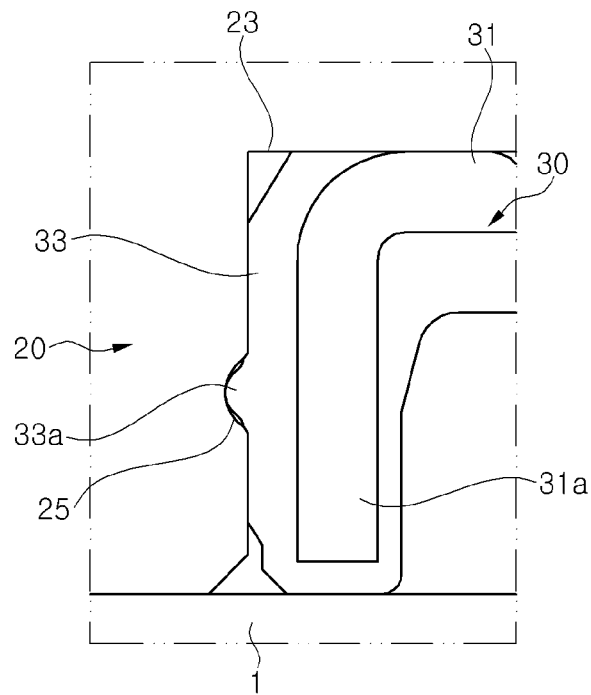
FIG. 3 is a partial enlarged view showing an assembly structure of a dust sealing member according to an embodiment of the present invention.
Figure 4:
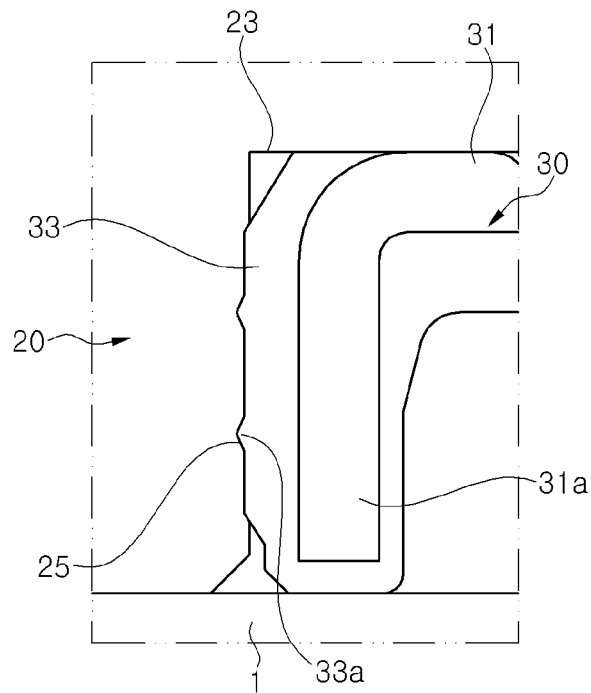
FIG. 4 is a partial enlarged view showing an assembly structure of a dust sealing member according to another embodiment of the present invention.
Figure 5:
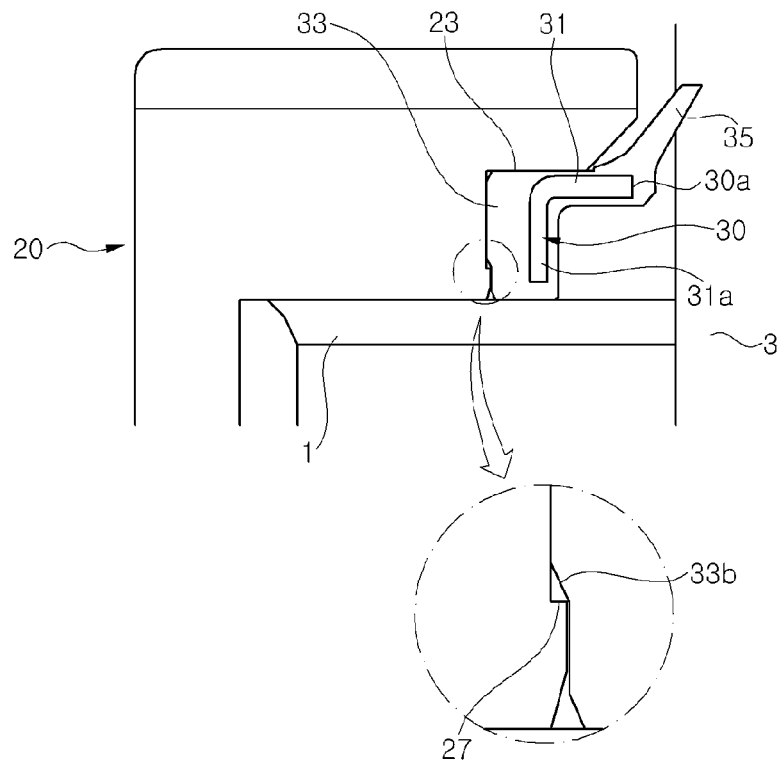
FIG. 5 is a partial enlarged view showing an assembly structure of a dust sealing member according to yet another embodiment of the present invention.
Figure 6:
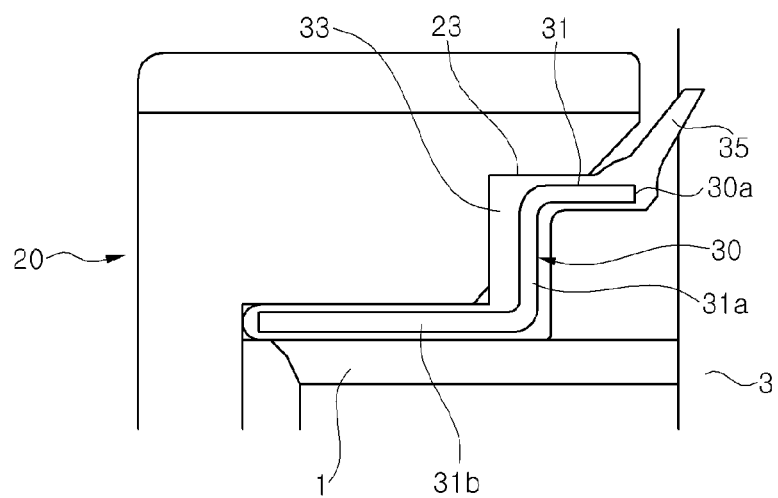
FIG. 6 is a partial enlarged view showing an assembly structure of a dust sealing member according to still another embodiment of the present invention.

FIG. 3 is a partial enlarged view showing an assembly structure of a dust sealing member according to an embodiment of the present invention, and FIG. 4 is a partial enlarged view showing an assembly structure of a dust sealing member according to another embodiment of the present invention. FIG. 5 is a partial enlarged view showing an assembly structure of a dust sealing member according to yet another embodiment of the present invention, and FIG. 6 is a partial enlarged view showing an assembly structure of a dust sealing member according to still another embodiment of the present invention.

As shown in FIGS. 3 to 6, the dust sealing member 30 includes a disk-shaped brush portion 31, a rubber portion 33, and a blocking plate 35. The brush portion 31 includes a hollow portion 30a into which the piston rod 3 is insertable. The rubber portion 33 is molded to enclose the brush portion 31. The blocking plate 35 is integrally formed with the rubber portion 33, protrudes to be inclined upward from the rubber portion 33 of the hollow portion (30a) side, and seals a gap between the hollow portion 30a and the piston rod 3. In this case, the dust sealing member 30 is tightly assembled in the installation groove 23. Therefore, only if the gap between the hollow portion 30a and the piston rod 3 is dust-sealed, the gap between the through-hole 21 and the piston rod 3 is dust-sealed. Meanwhile, the brush portion 31 includes a support portion 31a bent downward from the outer periphery of the brush portion 31. The lower end of the support portion 31a is supported by the top surface of the base shell 1.

Referring to FIGS. 3 and 4, the rubber portion 33 may include a latching protrusion 33a on the outer peripheral surface thereof. In particular, the latching protrusion 33a may be provided with one or more protrusions on the outer peripheral surface of the rubber portion 33 formed on the surface of the support portion 31a. Also, the latching protrusion 33a may be formed along the outer periphery of the rubber portion 33 in a ring shape or a bead shape. A latching groove 25 may be formed corresponding to the latching protrusion 33a on a lateral surface of the installation groove 23, such that the latching protrusion 33a is latched thereto. Therefore, the latching groove 25 may be provided with one or more grooves. Also, the latching groove 25 may be formed along the lateral inner periphery of the installation groove 23 in a ring shape or a concave bead shape.

As shown in FIG. 5, the rubber portion 33 may include one or more latching hooks 33b on the outer surface thereof. One or more assembly hooks 27 may be formed corresponding to the latching hooks 33b, such that the latching hooks 33b are latched thereto. Therefore, the dust sealing member 30 may be assembled in the installation groove 23.

As shown in FIG. 6, the brush portion 31 may include a fixing portion 31b bent outward from a lower end of the support portion 31a. The fixing portion 31b is formed to enclose the rubber portion 33 on the surface thereof. The fixing portion 31b is inserted between the cap member 20 and the base shell 1 and serves to fix the dust sealing member 30.

In the above-described dust seal structure for the shock absorber according to the present invention, the dust sealing member 30 is installed under the cap member 20 to effectively prevent dusts from being introduced between the cap member 20 and the piston rod 3. Therefore, it is possible to prevent oil leakage of the cylinder, which is caused by the accumulation of dusts on the oil seal 7. Moreover, the product reliability of the cylinder may be improved.

As described above, the dust sealing between the cap member and the piston rod may prevent dusts from being introduced into the inside of the cap member. Therefore, sealing performance may be improved, and oil leakage of the cylinder may be prevented.

While the dust seal structure for the shock absorber has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A dust seal structure for a shock absorber, comprising:
    a cylindrical base shell in which a piston valve and a piston rod are embedded;
    a cap member having a first side covering one end of the base shell and having a second side opposite the first side;
    an oil seal sealing the base shell; and
    a dust sealing member blocking dusts from being introduced at one side of the oil seal,
    wherein the cap member comprises:
    a through-hole which is formed in an upper central portion of the cap member and into which the piston rod is insertable; and
    a plurality of discharge groove portions, formed on an outer surface of the cap member arranged on the second side, extending radially from the through-hole in order to discharge dusts,
    wherein the plurality of discharge groove portions face away from an inside of the cylindrical base shell in an axial direction of the piston rod.

2. The dust seal structure according to claim 1, wherein the dust sealing member comprises:
   a disk-shaped brush portion with a hollow portion into which the piston rod is insertable;
   a rubber portion enclosing the brush portion; and
   a blocking plate protruding from the rubber portion of a hollow portion side to seal a gap between the hollow portion and the piston rod.

3. The dust seal structure according to claim 2, wherein the blocking plate is integrally formed with the rubber portion and protrudes to be inclined from the rubber portion.

4. The dust seal structure according to claim 1, wherein the cap member comprises:
   a through-hole which is formed in a central portion of the cap member and into which the piston rod is insertable; and
   an installation groove which is recessed along a lower circumference of the through-hole and into which the dust sealing member is fit.

5. The dust seal structure according to claim 2, wherein the rubber portion comprises:
   one or more latching protrusions formed on an outer peripheral surface of the rubber portion; and
   one or more latching grooves formed corresponding to the one or more latching protrusions in the installation groove.

6. The dust seal structure according to claim 2, wherein the rubber portion comprises:
   a latching hook formed on an outer surface of the rubber portion; and
   an assembly hook formed corresponding to the latching hook in the installation groove.

7. The dust seal structure according to claim 2, wherein the brush portion comprises a support portion bent downward from an outer periphery of the brush portion and supported to the base shell.

8. The dust seal structure according to claim 7, wherein the brush portion comprises a fixing portion bent outward from a lower end of the support portion and fit and fixed between the base shell and the cap member.

9. A dust seal structure for a shock absorber, comprising:
   a cylindrical base shell in which a piston valve and a piston rod are embedded;
   a cap member covering one end of the base shell;
   an oil seal sealing the base shell; and
   a dust sealing member blocking dusts from being introduced at one side of the oil seal,
   wherein the cap member comprises:
   a through-hole which is formed in an upper central portion of the cap member and into which the piston rod is insertable; and
   a plurality of discharge groove portions, formed on an outer peripheral surface of the combined base shell and cap member, extending radially from the through-hole in order to discharge dusts,
   wherein the plurality of discharge groove portions face away from an inside of the cylindrical base shell in an axial direction of the piston rod.

10. The dust seal structure according to claim 9, wherein the dust sealing member comprises:
   a disk-shaped brush portion with a hollow portion into which the piston rod is insertable;
   a rubber portion enclosing the brush portion; and
   a blocking plate protruding from the rubber portion of a hollow portion side to seal a gap between the hollow portion and the piston rod.

11. The dust seal structure according to claim 10, wherein the blocking plate is integrally formed with the rubber portion and protrudes to be inclined from the rubber portion.

12. The dust seal structure according to claim 9, wherein the cap member comprises:
   a through-hole which is formed in a central portion of the cap member and into which the piston rod is insertable; and
   an installation groove which is recessed along a lower circumference of the through-hole and into which the dust sealing member is fit.

13. The dust seal structure according to claim 10, wherein the rubber portion comprises:
   one or more latching protrusions formed on an outer peripheral surface of the rubber portion; and
   one or more latching grooves formed corresponding to the one or more latching protrusions in the installation groove.

14. The dust seal structure according to claim 10, wherein the rubber portion comprises:
   a latching hook formed on an outer surface of the rubber portion; and
   an assembly hook formed corresponding to the latching hook in the installation groove.

15. The dust seal structure according to claim 10, wherein the brush portion comprises a support portion bent downward from an outer periphery of the brush portion and supported to the base shell.

16. The dust seal structure according to claim 15, wherein the brush portion comprises a fixing portion bent outward from a lower end of the support portion and fit and fixed between the base shell and the cap member.

* * * * *